United States Patent
Yamada et al.

(10) Patent No.: US 6,755,267 B2
(45) Date of Patent: Jun. 29, 2004

(54) ELECTRIC VEHICLE AND CONTROL DEVICE THEREOF

(75) Inventors: Hiroyuki Yamada, Hitachinaka (JP); Minoru Kaminaga, Hitachinaka (JP); Kazuhito Ishida, Hitachinaka (JP); Kaname Sasaki, Hitachinaka (JP)

(73) Assignees: Hitachi, Lyd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 43 days.

(21) Appl. No.: 09/961,687

(22) Filed: Sep. 25, 2001

(65) Prior Publication Data

US 2002/0068655 A1 Jun. 6, 2002

(30) Foreign Application Priority Data

Dec. 6, 2000 (JP) ........................................ 2000-376554

(51) Int. Cl.[7] .................................................. B60K 1/00
(52) U.S. Cl. ...................... 180/65.8; 180/65.1; 318/139
(58) Field of Search ............................... 180/65.1, 65.5, 180/65.8, 216, 908; 363/39, 40, 47; 318/139, 293

(56) References Cited

U.S. PATENT DOCUMENTS

| | | | | |
|---|---|---|---|---|
| 3,903,465 A | * | 9/1975 | Ibamoto et al. | ......... 318/139 X |
| 4,411,582 A | * | 10/1983 | Nakada | ....................... 414/636 |
| 4,472,663 A | * | 9/1984 | Melocik | ................. 318/139 X |
| 4,691,274 A | * | 9/1987 | Matouk et al. | ............. 363/141 |
| 4,961,042 A | * | 10/1990 | Imaseki | ...................... 318/758 |
| 4,994,973 A | * | 2/1991 | Makino et al. | ............... 701/50 |
| 5,005,659 A | * | 4/1991 | Jones et al. | ................. 180/65.1 |
| 5,181,173 A | * | 1/1993 | Avitan | .......................... 701/42 |
| 5,638,387 A | * | 6/1997 | Palleggi et al. | ............... 318/67 |
| 5,646,513 A | * | 7/1997 | Riggio, Jr. | ................... 323/285 |
| 5,723,956 A | * | 3/1998 | King et al. | ................. 318/139 |
| 6,023,137 A | * | 2/2000 | Kumar et al. | ............... 378/254 |
| 6,028,403 A | * | 2/2000 | Fukatsu | ....................... 318/88 |

FOREIGN PATENT DOCUMENTS

| | | | |
|---|---|---|---|
| JP | 02179203 | | 7/1990 |
| JP | 04165901 | | 6/1992 |
| JP | 05-092897 | | 4/1993 |
| JP | 07-295662 | | 11/1995 |
| JP | 09215108 | | 8/1997 |
| JP | 10042408 | | 2/1998 |
| JP | 11-11145 | * | 1/1999 |
| JP | 11-98618 | * | 4/1999 |
| JP | 2001-31392 | * | 2/2001 |
| JP | 2002-338197 | * | 11/2002 |

* cited by examiner

Primary Examiner—Bryan Fischmann
(74) Attorney, Agent, or Firm—Crowell & Moring LLP

(57) ABSTRACT

The present invention aims to provide an electric vehicle which provides good usability for a user and is economical and to provide a control device for an electric vehicle, which is high in reliability. An AC motor is used as a motor for driving running or driving wheels, and DC motors are respectively used as a steering auxiliary motor and a motor for driving a forklift device. Further, in order to achieve the above aim, an inverter circuit and chopper circuits are connected in parallel with a battery, and an electrolytic capacitor is connected in parallel with the inverter circuit, whereas an electrolytic capacitor is connected in parallel with the chopper circuit.

7 Claims, 11 Drawing Sheets

ELECTRIC VEHICLE AND CONTROL DEVICE THEREOF

BACKGROUND OF THE INVENTION

1. Field of the Invention

The present invention relates to an electric vehicle having a plurality of motors, and a control device thereof.

2. Description of the Related Art

Conventional electric vehicles each having a plurality of motors and their control devices, are described in, for example, JP-A Nos. Hei 10(1998)-42408, Hei 2(1990)-179203, Hei 9(1997)-215108 and Hei 4(1992)-165901.

JP-A No. Hei 10(1998)-42408 has described a battery driven type forklift using AC motors as ones for driving and cargo-handling, and a DC motor as one auxiliary to steering. JP-A No. Hei 2(1990)-179203 has described a battery forklift using DC motors of the type used for driving, cargo-handling and steering assistance.

JP-A No. Hei 9(1997)-215108 has described a control device for an electric vehicle, wherein a plurality of VVVF (Variable Voltage Variable Frequency) inverters and CVCF (Constant Voltage Constant Frequency) inverters are connected in parallel with a power supply and capacitors are connected in parallel with the respective inverters, and even when the CVCF inverters malfunction and thereby the CVCF inverters are disconnected to substitute some of the VVVF inverters for the CVCF inverters, the electrostatic capacitance of each capacitor can be held in a manner similar to its pre-switching.

JP-A No. Hei 4(1992)-165901 has described a control device for an electric vehicle, wherein inverters and DC-DC converters are connected in parallel with a power supply through relays and capacitors are connected in parallel with the inverters and DC-DC converters, and timings provided to charge the respective capacitors are controlled according to timings provided to close and open the respective relays, thereby making it possible to perform mutual charging and discharging of the capacitors in equilibrium.

According to a device described in JP-A No. Hei 10(1998)-42408, since the AC motor is used as the motor used for the cargo-handling regardless of the non-need for complex control, the control device becomes complex in structure and thereby becomes expensive.

According to a device described in JP-A No. Hei 2(1990)-179203, since a DC motor is used as a motor for driving the wheels. However since the DC motor does not have a highly precise control, a delay time (time loss) caused at the time of changing into forward drive or backward drive increases, the feeling of torque escape (namely the feeling by which the torque is lost for a moment) caused at the time of transition from regeneration to powering increases, and a response at the time of brake regeneration or regeneration based on an acceleration switch-off goes down.

According to a device described in JP-A No. Hei 9(1997)-215108, closing/opening means having a switching contact must additionally be provided so that the electrostatic capacitance of each capacitor can be held in a manner similar to the pre-switching, and hence the control device becomes expensive. No allowance is made for the operation of the control device where any of the VVVF inverters connected in parallel with the power supply has been at fault, and hence the reliability of the control device is degraded.

According to a device described in JP-A No. Hei 4(1992)-165901, even if a malfunction occurs in any of respective circuits for three or more motors, there is no consideration for executing the proper operation of the remaining two or more circuits without being affected by such a defective circuit.

SUMMARY OF THE INVENTION

An object of the present invention is to provide a usable an economical electric vehicle, and to provide a high-reliable control device suitable for an electric vehicle.

A basic feature of the present invention is as follows. An AC motor is used as a motor for driving wheels, and DC motors are used as a motor for assisting the steering of each wheel and a motor for driving a forklift device. An AC motor capable of performing precise control may preferably be used for driving the wheels to improve tactile feel to a driver. On the other hand, since complex control is unnecessary for the motor for assisting or assisting the steering of each wheel and the motor for driving the forklift device, DC motors capable of serving as a drive system simple in structure and low in cost may preferably be used. According to the present invention, since the AC motor is used as the motor for driving the wheels and the DC motors are used as the motor for assisting the steering of each wheel and the motor for driving the forklift device, a drive system, which provides good feelings to a driver during running, and which is used for steering assistance and driving of the forklift device, can be simplified in structure and reduced in cost.

Another feature of the present invention resides in that a plurality of power converting circuits for respectively converting power supplied from a power supply and supplying the same to a motor for driving wheels, a motor for assisting the steering of each steering wheel, and a motor for driving a forklift device are connected in parallel with the power supply, and capacitive elements are connected in parallel with at least two of the plurality of power converting circuits. According to the present invention, since the plurality of power converting circuits are connected in parallel with the power supply, they can respectively be operated independent of one another. Further, even if a malfunction occurs in any of the plurality of power converting circuits, since the capacitive elements are connected in parallel with at least two of the plurality of power converting circuits, the remaining power converting circuits can properly be operated without being affected by such a defective power converting circuit.

DETAILED DESCRIPTION OF THE PREFERRED EMBODIMENTS

Preferred embodiments of the present invention will hereinafter be described in detail with reference to the accompanying drawings.

(First Embodiment)

Figure 1:
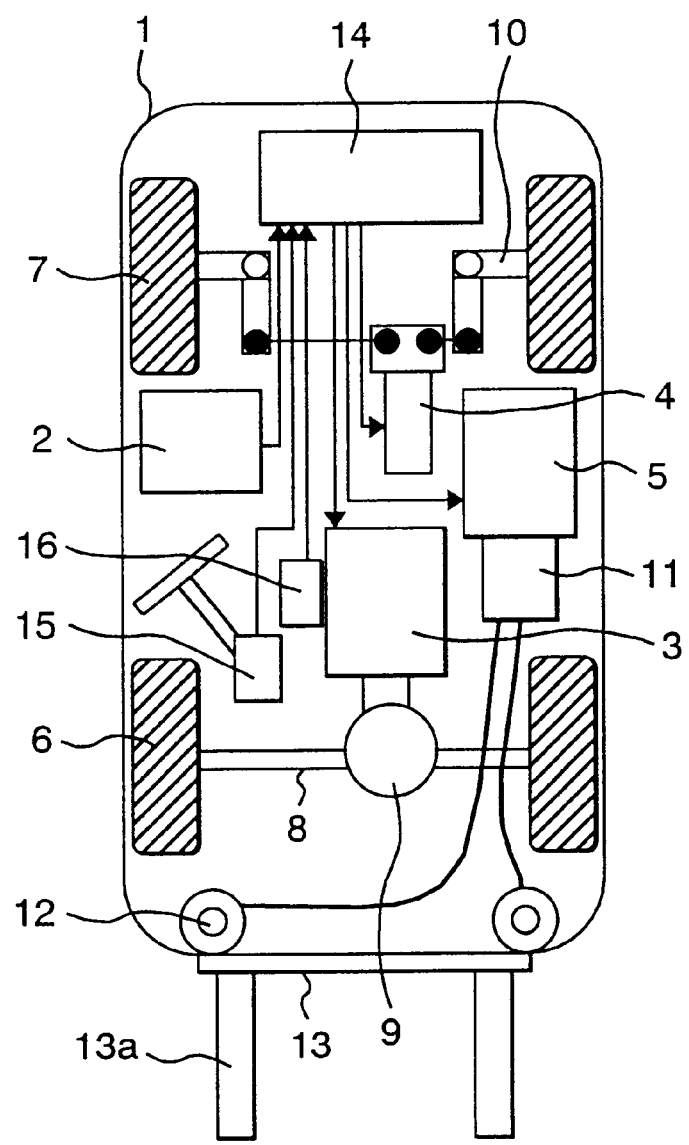
FIG. 1 is a plan view showing a vehicle construction of a forklift truck according to a first embodiment of the present invention.

A first embodiment of the present invention will be described based on FIGS. 1 through 4. FIG. 1 shows a vehicle construction of an electric vehicle according to the first embodiment. The electric vehicle according to the present embodiment is a forklift truck which loads and unloads and carries cargoes unitized by using pallets, for example. A battery driven type vehicle is used which is constructed with a motor 3 for driving wheels, a motor 4 auxiliary to assist steering of steering wheels, and a motor 5 for driving a forklift device are driven by power of a battery 2 which serves as a vehicle-mounted power supply.

Front wheels 6 corresponding to a left-right pair of wheels which are directly coupled to an axle shaft 8, and rear wheels 7 corresponding to a left-right pair of wheels which are directly coupled to an output shaft of a power steering device 10 are rotatably attached to a vehicle body 1 of the forklift truck. The forklift device 13 for loading and unloading cargoes is attached to a front part of the vehicle body 1. The forklift device 13 comprises a mast upright provided at the front part of the vehicle body 1, and a fork 13a vertically moved along the mast.

In the forklift truck, the front wheels 6 are used as the driving wheels, and the rear wheels 7 are used as the steering wheels so that it is capable of loading and unloading and carrying cargoes while taking advantage of small turning circles. A reducer 9 is attached to the axle shaft 8 for the front wheels 6 so that rotating power of the motor 3 can be amplified and transmitted thereto. An AC motor is used as the motor 3. The AC motor is used for driving because it can provide precise control, and therefore the actual feel of the drivers improve. For example, a delay in time at forward or backward switching is small, the feeling of torque escape at the transition from regeneration to powering is low, and a response at each of brake regeneration and regeneration based accelerator is good and smooth.

A shaft of the motor 4 for assisting steering is coupled to the drive shaft of the power steering device 10 connected to the rear wheels 7 via a power transmission mechanism so that the power of the motor 4 can be transmitted to the drive shaft of the power steering device as a steering auxiliary force. A DC motor is used as the steering auxiliary motor 4. The reason why the DC motor is used as a steering auxiliary motor in this way, is because complex control is unnecessary. A drive system simple in control and low in cost can be provided.

The forklift device 13 is driven under hydraulic power. A hydraulic drive system includes a hydraulic cylinder 12 for moving the fork 13a in upward and downward directions, a hydraulic pump 11 for supplying oil to the hydraulic cylinder 12 and draining it therefrom to thereby drive the hydraulic cylinder 12, and the motor 5 for driving the hydraulic pump 11 which is mounted to the vehicle body 1 of the forklift truck. A DC motor is used as the motor 5. The DC motor is used for driving the forklift device in this way because complex control is unnecessary for driving the forklift device, and therefore a drive system simple in control and low in cost can be provided.

According to the present embodiment, since a drive system provides a good tactile feeling to a driver during operation and is simple in structure and low in cost as a steering auxiliary and forklift-device, it is possible to provide a forklift truck which is useable and economical. Since a drive system auxiliary to the steering and used for driving the forklift device, can easily be constructed, the control device can be reduced in size.

Figure 2:
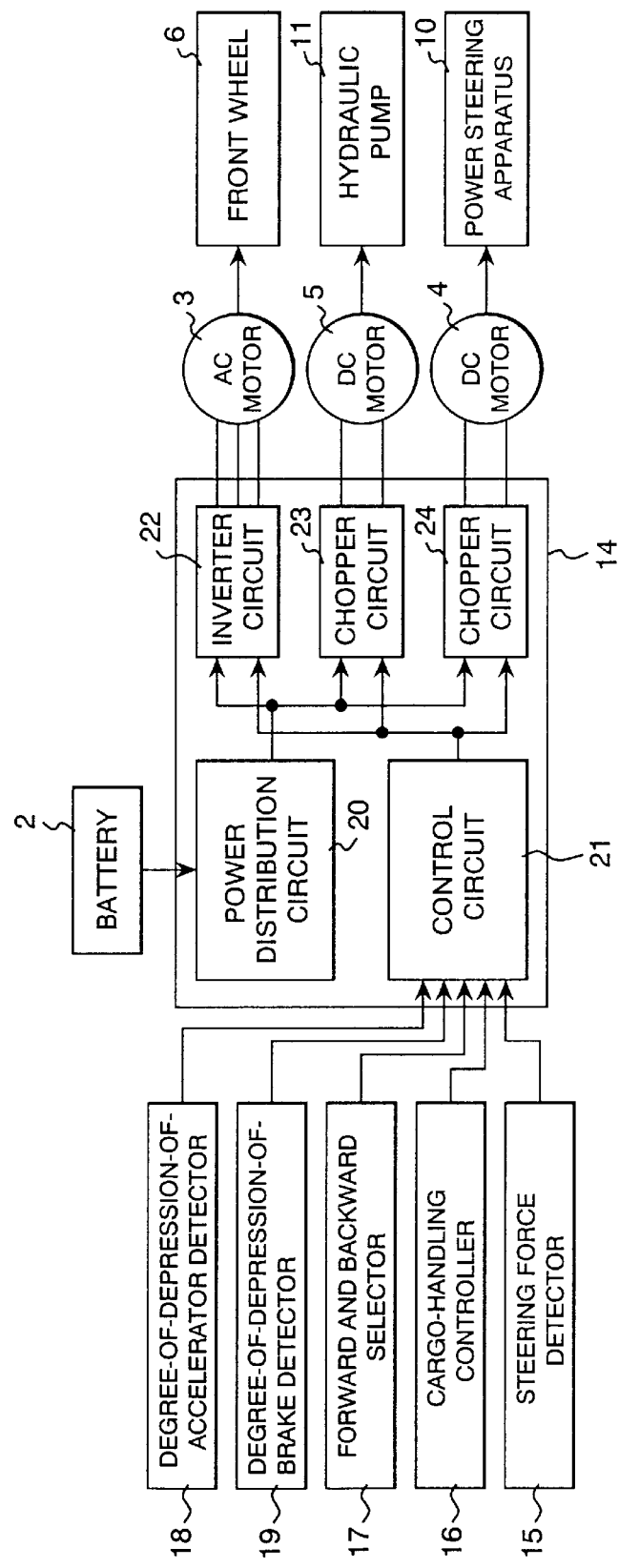
FIG. 2 is a block diagram showing a circuit configuration of a control device shown in FIG. 1.

FIG. 2 shows a circuit configuration of the control device. The forklift truck is provided with a control device 14 which converts DC power supplied from the battery 2 to predetermined power by means of a power converting circuit, and supplies it to the motor 3, the steering auxiliary motor 4 and the motor 5 to thereby drive them. The control device 14 comprises an inverter circuit 22, chopper circuits 23 and 24, a power distribution circuit 20 and a control circuit 21. Incidentally, the inverter circuit 22, the chopper circuits 23 and 24 and the power distribution circuit 20 might collectively be called a "main circuit".

The control circuit 21 computes and outputs control signals, based on input signals to control the inverter circuit 22, and the chopper circuits 23 and 24. In the present embodiment, the following signals are inputted to the control circuit 21 as the input signals. Namely, a degree-of-depression (operating)-of-accelerator signal outputted from detector 18 for detecting the degree of depression (operating) of an accelerator, a degree-of-depression (operating)-of-brake signal outputted from detector 19 for detecting the degree of depression (operating) of a brake, a forward and backward select signal outputted from a selector 17 for selecting the forward and backward movements of the forklift truck, a cargo-handling control signal outputted from controller 16 for controlling the forklift device 13, and a steering force signal outputted from detector 15 for detecting a steering force of a handle are inputted to the control circuit 21.

Further, the control circuit 21 computes and outputs control signals to control the inverter circuit 22 and the chopper circuits 23 and 24, based on the input signals inputted in this way. Namely, the control circuit 21 computes and outputs a driving control signal to control the inverter circuit 22, based on the degree-of-depression-of-accelerator signal, the degree-of-depression-of-brake signal and the forward and backward select signal; a cargo-handling control signal to control the chopper circuit 23, based on the cargo-handling control signal; and a cargo-handling control signal to control the chopper circuit 24, based on the steering force signal, respectively.

The inverter circuit 22 is a power converting circuit which is provided in association with the motor 3 for driving the driving wheels and comprises switching devices. The inverter circuit 22 is supplied with the DC power from the battery 2 via the power distribution circuit 20 and receives the driving control signal inputted from the control circuit 21. The inverter circuit 22 converts the DC power supplied from the battery 2 to predetermined three-phase AC power, based on the driving control signal outputted from the control circuit 21 and supplies it to the motor 3. The motor 3 is driven based on the three-phase AC power to thereby generate rotating power necessary for the driving of the front wheels 6.

The chopper circuit 23 is a power converting circuit which is provided in association with the motor 5 for driving the forklift device and comprises switching devices. The chopper circuit 23 is supplied with the DC power from the battery 2 via the power distribution circuit 20 and receives the cargo-handling control signal inputted from the control circuit 21. The chopper circuit 23 converts the DC power supplied from the battery 2 to predetermined DC power, based on the cargo-handling control signal outputted from the control circuit 21 and supplies it to the motor 5. The motor 5 is driven based on the DC power to thereby generate rotating power necessary for the driving of the hydraulic pump 11.

The chopper circuit 24 is a power converting circuit which is provided in association with the steering auxiliary motor 4 and comprises switching devices. The chopper circuit 24 is supplied with the DC power from the battery 2 via the power distribution circuit 20 and receives the steering force control signal inputted from the control circuit 21. The chopper circuit 24 converts the DC power to predetermined DC power, based on the steering force control signal and supplies it to the steering auxiliary motor 4. The steering auxiliary motor 4 is driven based on the DC power to thereby generate rotating power transmitted to the power steering device 10 as a steering auxiliary force.

Figure 3:
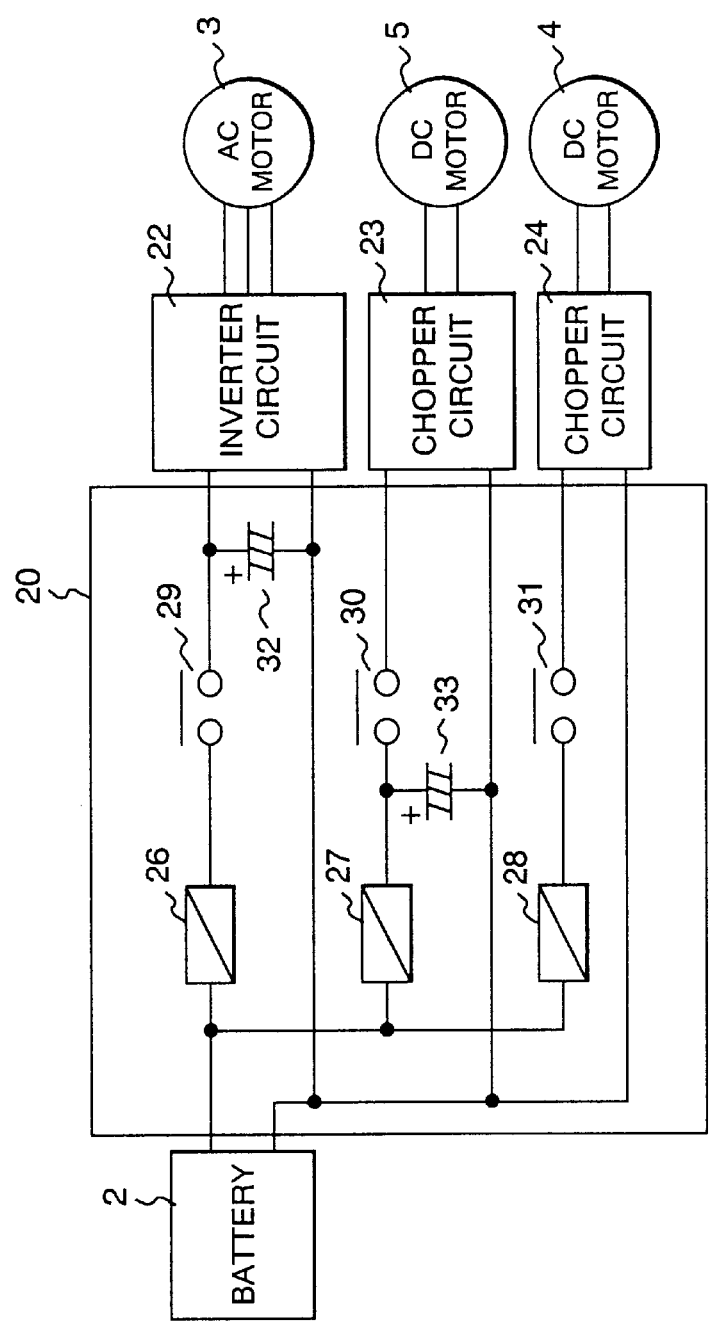
FIG. 3 is a block diagram showing a circuit configuration of a power distribution circuit shown in FIG. 2.

FIG. 3 is a circuit configuration of the power distribution circuit. The power distribution circuit 20 is one for connecting the inverter circuit 22 and the chopper circuits 23 and 24 in parallel with the battery 2. Therefore, the positive electrode sides of the inverter 22 and chopper circuits 23 and 24 are respectively connected to the positive electrode side of the battery 2, whereas the negative electrode sides of the inverter 22 and chopper circuits 23 and 24 are respectively connected to the negative electrode side of the battery 2. A fuse 26 and a contactor 29 are connected in series with a wiring for connecting the positive electrode side of the battery 2 and the positive electrode side of the inverter circuit 22. A fuse 27 and a contactor 30 are connected in series with a wiring for connecting the positive electrode side of the battery 2 and the positive electrode side of the chopper circuit 23. A fuse 28 and a contactor 31 are connected in series with a wiring for connecting the positive electrode side of the battery 2 and the chopper circuit 24.

The fuses 26, 27 and 28 are respectively current cut-off members which melt down when a current above a predetermined value has flowed in the circuit to thereby block the flow of the current. The contactors 29, 30 and 31 respectively have movable contacts and fixed contacts and are respectively switches each of which causes the movable contact to contact the fixed contact and be separated therefrom, thereby connecting and disconnecting between the circuit on the battery 2 side and the circuit on the power converting circuit side.

An electrolytic capacitor 32 corresponding to a capacitive element is connected between the inverter circuit 22 side of the contactor 29 on the wiring (this wiring is for connecting the positive electrode of the battery 2 and the positive electrode of the inverter circuit 22 ) and the wiring (this wiring is for connecting the negative electrode of the battery 2 and the negative electrode of the inverter circuit 22), so as to be placed in parallel with the inverter circuit 22. An electrolytic capacitor 33 corresponding to a capacitive element is connected between the fuse 27 side of the contactor 30 on the wiring (this wiring is for connecting the positive electrode of the battery 2 and the positive electrode of the chopper circuit 23) and the wiring (this wiring is for connecting the negative electrode of the battery 2 and the negative electrode of the chopper circuit 23), so as to be placed in parallel with the chopper circuit 23. According to such a construction, the whole electrostatic capacitance of the main circuit of the control device 14 is determined according to the value equivalent to the sum of the electrostatic capacitance of the electrolytic capacitor 32 and that of the electrolytic capacitor 33.

The electrolytic capacitor 32 connected in parallel with the inverter circuit 22 serves as a filter for, for example, smoothing the voltage of the battery 2. Therefore, the electrolytic capacitor 32 needs a relatively large value, e.g., about thousands to ten thousands of $\mu F$ as the electrolytic capacitance. Thus the positive electrode side of the electrolytic capacitor 32 may preferably be connected between the contactor 29 and the inverter circuit 22. Namely, when the positive electrode side of the electrolytic capacitor 32 is connected between the fuse 26 and the contactor 29, a very large charge supplied from the battery 2 is always stored in the electrolytic capacitor 32 and hence this is undesirable from the viewpoint of safety. This is also because when the electrolytic capacitor 32 and the battery 2 are connected at a connecting position similar to the above in a state in which no charge is stored in the electrolytic capacitor 32, there is a fear that an inrush current occurs in the electrolytic capacitor 32, thereby leading to the occurrence of meltdown or the like of the fuse 26. Incidentally, a charging resistor or the like might be connected in parallel with the contactor 29 to inhibit the charged inrush current.

The electrolytic capacitor 33 connected in parallel with the chopper circuit 23 is provided to lessen the influence of noise produced by the operation of the chopper circuit 23 on other parallel-connected devices. Further, the electrolytic capacitor 33 is also provided to lessen a surge voltage produced by the operation of the chopper circuit 23. This point will be described below in detail with reference to FIG. 4.

Figure 4:
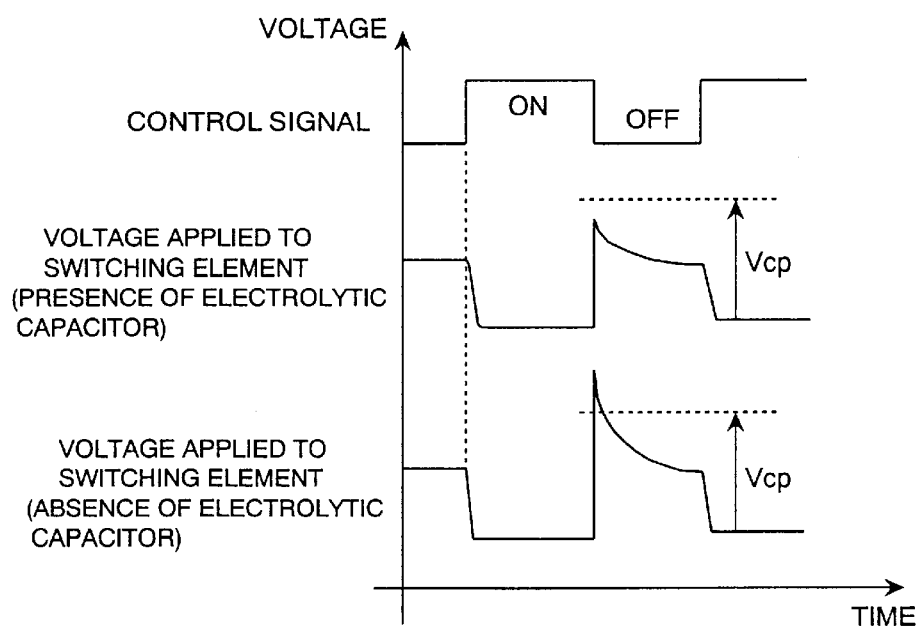
FIG. 4 is a characteristic diagram showing a voltage characteristic of a chopper circuit in the presence and absence of an electrolytic capacitor.

FIG. 4 shows a voltage characteristic of a chopper circuit in the presence and absence of an electrolytic capacitor. The chopper circuit opens and closes a switching device (e.g., thyristor), and converts DC power to a predetermined amount of DC and applies it to a DC motor in such a manner that a predetermined speed or torque is obtained by the DC motor. Since the switching device turns on or turns off large power at a high speed here, a voltage applied to the switching device jumps due to the electrostatic capacitance or the like of the main circuit upon off of the switching device (when a control signal is rendered OFF as shown in FIG. 4). Namely, a surge voltage is generated. The faster the off time of the switching device, the larger the surge voltage. Additionally, the greater the cut-off power, the larger the surge voltage. Therefore, a surge voltage exceeding an allowable withstand voltage of the switching device might be produced. Thus, if means for inhibiting the surge voltage is not provided, then there is a possibility of failure of the switching device.

Therefore, in the present embodiment, the electrolytic capacitor is connected in parallel with its corresponding chopper circuit so as to absorb the generated surge voltage. When the electrolytic capacitor is parallel-connected to its corresponding chopper circuit, the surge voltage is inhibited by the electrolytic capacitor as shown in FIG. 4 so that the voltage applied to the switching device is retained low as compared with an allowable withstand voltage Vup of the switching device. On the other hand, when the electrolytic capacitor is not parallel-connected to the chopper circuit (when no surge voltage inhibiting means is provided), the voltage applied to the switching device will exceed the allowable withstand voltage Vup thereof.

According to the present embodiment, since the inverter circuit 22 and the chopper circuits 23 and 24 are respectively connected in parallel with the battery 2, the motor 3 for driving the driving wheels, the steering auxiliary motor 4 used for the steering wheels, and the motor 5 for driving the forklift device can respectively be operated independent of one another. Further, according to the present embodiment, the electrolytic capacitor 32 is connected in parallel with the inverter circuit 22, and the electrolytic capacitor 33 is connected in parallel with the chopper circuit 23. Therefore, even when any of the circuits for driving the three motors malfunctions so that the contactor is opened or the fuse melts down, the circuits for driving the normal two motors can be operated normally.

If the electrolytic capacitor 33 is not connected in parallel with the corresponding chopper circuit 23, for example, when the contactor 29 is made open or the fuse 26 melts down due to the malfunction or the like of the inverter circuit 22 or the motor 3, the electrolytic capacitor 32 is disconnected from the main circuit and hence the electrostatic capacitance is lost from the main circuit correspondingly. When the chopper circuit 23 or the chopper circuit 24 is operated in such a state, there is a fear that either the chopper circuit 23 or the chopper circuit 24 will break due to a surge voltage.

According to the present embodiment, however, since the main circuit includes the electrolytic capacitor 33 connected in parallel with the chopper circuit 23 in addition to the electrolytic capacitor 32 connected in parallel with the inverter circuit 22 (the whole electrostatic capacitance of the main circuit is determined based on the value of the sum of the electrostatic capacitance of the electrolytic capacitor 32 and that of the electrolytic capacitor 33), the electrolytic capacitor 33 remains in the main circuit (electrostatic capacitance is not lost from the main circuit) even if the electrolytic capacitor 32 is disconnected from the main circuit. It is thus possible to absorb the noise and surge voltage produced with the operation of the chopper circuit 23 or the chopper circuit 24. Further, the chopper circuit 23 or the chopper circuit 24 will not fail.

Since the electrolytic capacitor 33 can have a relatively small electrostatic capacitance, the on-charge inrush current and stored charge supplied from the battery 2 may be small even if the positive electrode side of the electrolytic capacitor 33 is connected between the fuse 27 and the contactor 30. Further, no restraints are placed on the connecting position as in the case of the electrolytic capacitor 32 connected in parallel with the inverter circuit 22.

Further, even when, for example, the chopper circuit 23 or the motor 5 malfunctions to thereby make the contactor 30 open where the electrolytic capacitor 33 is at the connection position, the electrolytic capacitor 33 remains connected to the main circuit without being disconnected therefrom, and the electrostatic capacitance of the main circuit remains unchanged. Therefore, the electrostatic capacitance of the electrolytic capacitor 33 can compensate for part of the electrostatic capacitance of the electrolytic capacitor 32 as seen from the inverter circuit 22. Accordingly, there is not need to provide electrolytic capacitors more than needs.

Assuming that when the number of electrolytic capacitors necessary for the inverter circuit 22 is four, for example, the four electrolytic capacitors are all collectively placed in the connecting position of the electrolytic capacitor 32. One electrolytic capacitor is further required when the contactor 29 is rendered open (for the prevention of breakage of the chopper circuit 23). However, owing to the provision of one of the four capacitor at the connecting position of the electrolytic capacitor 32, such an electrolytic capacitor can be shared for the prevention of breakage of the inverter circuit 22 and the chopper circuit 23. It is not necessary to provide an additional electrolytic capacitors. Thus, according to the present embodiment, the control device 14 can be brought into reduced size and cost.

(Second Embodiment)

Figure 5:
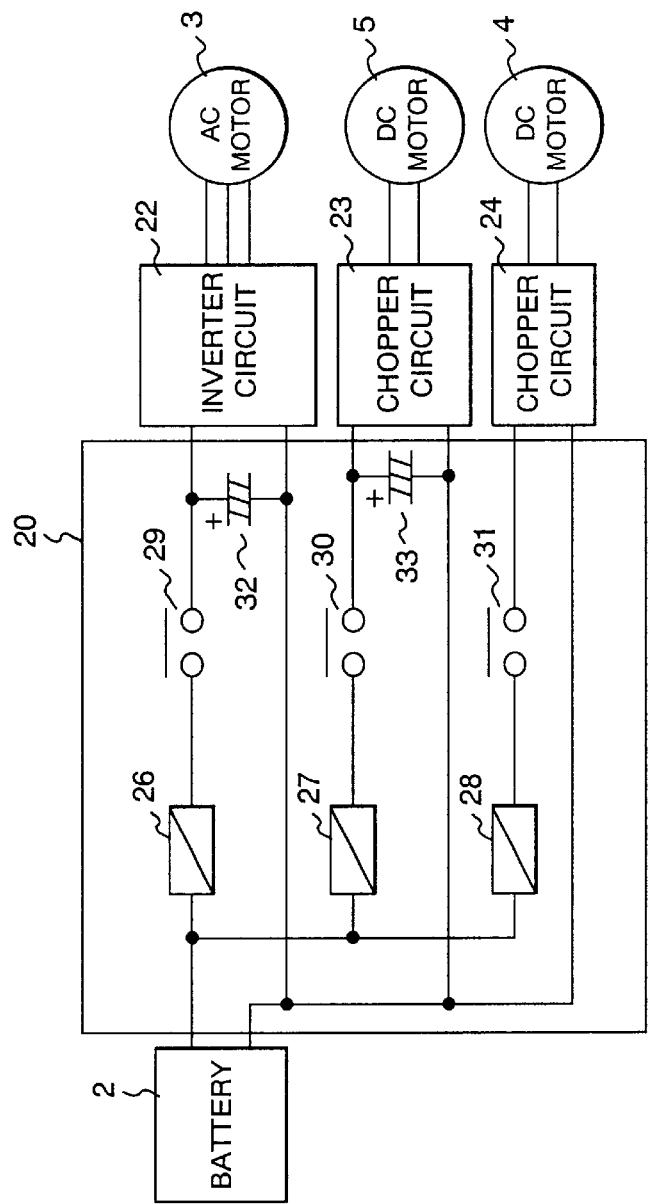
FIG. 5 is a block diagram showing a circuit configuration of a power distribution circuit of a control device for a forklift truck according to a second embodiment of the present invention.

A second embodiment of the present invention will be explained based on FIG. 5. which shows a circuit configuration of a power distribution circuit. Incidentally, other circuit configurations of a forklift truck and a control device are constructed in a manner similar to the previous embodiment. Only portions different from those of the power distribution circuit employed in the aforementioned embodiment will be explained below.

In the power distribution circuit 20 employed in the present embodiment, the positive electrode side of an electrolytic capacitor 33 is connected to the chopper circuit 23 side of a contactor 30 on a wiring for connecting the positive electrode side of a battery 2 and the positive electrode side of chopper circuit 23. According to such a configuration, when the electrostatic capacitance of the electrolytic capacitor 33 connected in parallel with the chopper circuit 23 is large, it is possible to avoid the inconvenience of meltdown (blowing) of a fuse 27 or a stored charge due to the above-described inrush current. It is also possible to further improve the reliability of the power distribution circuit 20.

(Third Embodiment)

Figure 6:
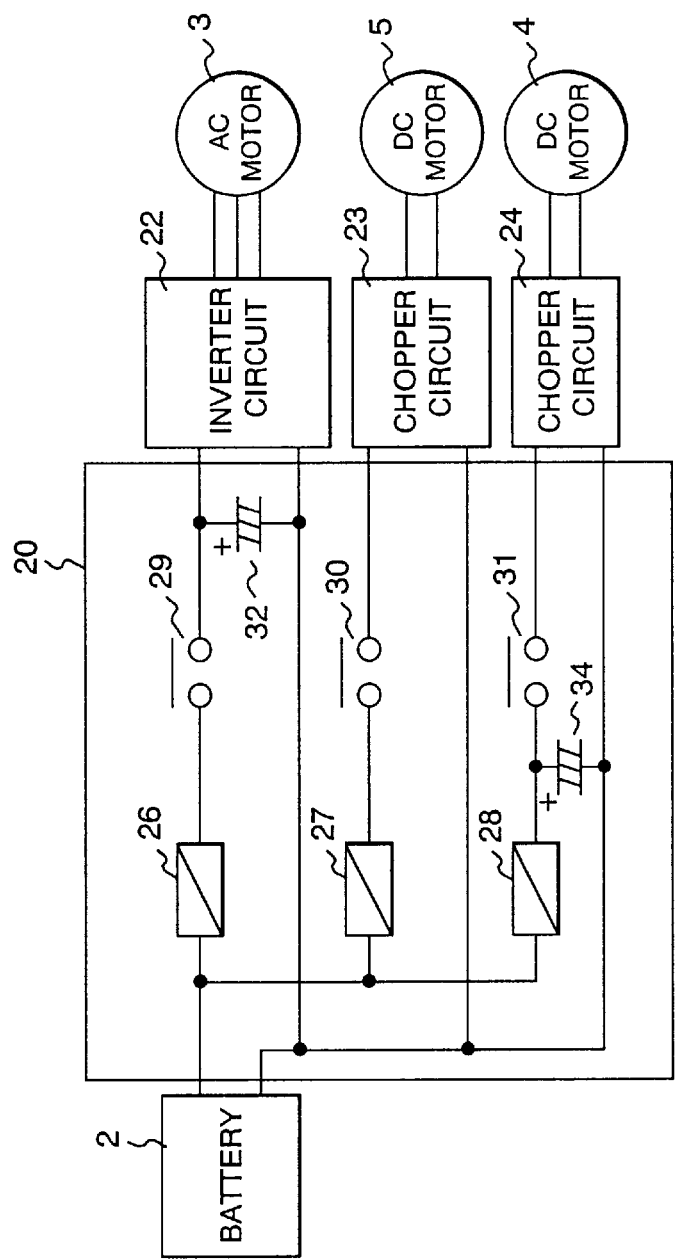
FIG. 6 is a block diagram showing a circuit configuration of a power distribution circuit of a control device for a forklift truck according to a third embodiment of the present invention.

A third embodiment of the present invention will be explained based on FIG. 6. FIG. 6 shows a circuit configuration of a power distribution circuit. Incidentally, other circuit configurations of a forklift truck and a control device are constructed in a manner similar to the previous embodiment. Only portions different from those of the power distribution circuit employed in the aforementioned embodiment will be explained below.

In the power distribution circuit 20 employed in the present embodiment, an electrolytic capacitor 34 is connected between the fuse 28 side of a contactor 31 on a wiring (this wiring is for connecting the positive electrode of a battery 2 and the positive electrode of a chopper circuit 24 and a wiring (this wiring is for connecting the negative electrode of the battery 2 and the negative electrode of the chopper circuit 24, so as to be connected in parallel with the chopper circuit 24. According to such a configuration, the whole electrostatic capacity of a main circuit is determined based on the value of the sum of the electrostatic capacitance of an electrolytic capacitor 32 and that of the electrolytic capacitor 34. Further, operations and effects similar to those obtained in the first embodiment can be achieved.

Incidentally, when the electrostatic capacitance of the electrolytic capacitor 34 connected in parallel with the chopper circuit 24 is large, the positive electrode side of the electrolytic capacitor 34 may be connected to the chopper circuit 24 side of a contactor 31 connected to a wiring for connecting the positive electrode side of the battery 2 and the positive electrode side of the chopper circuit 24 so as to avoid the inconvenience of meltdown of a fuse 28 or a stored charge due to the above-described inrush current.

(Fourth Embodiment)

Figure 7:
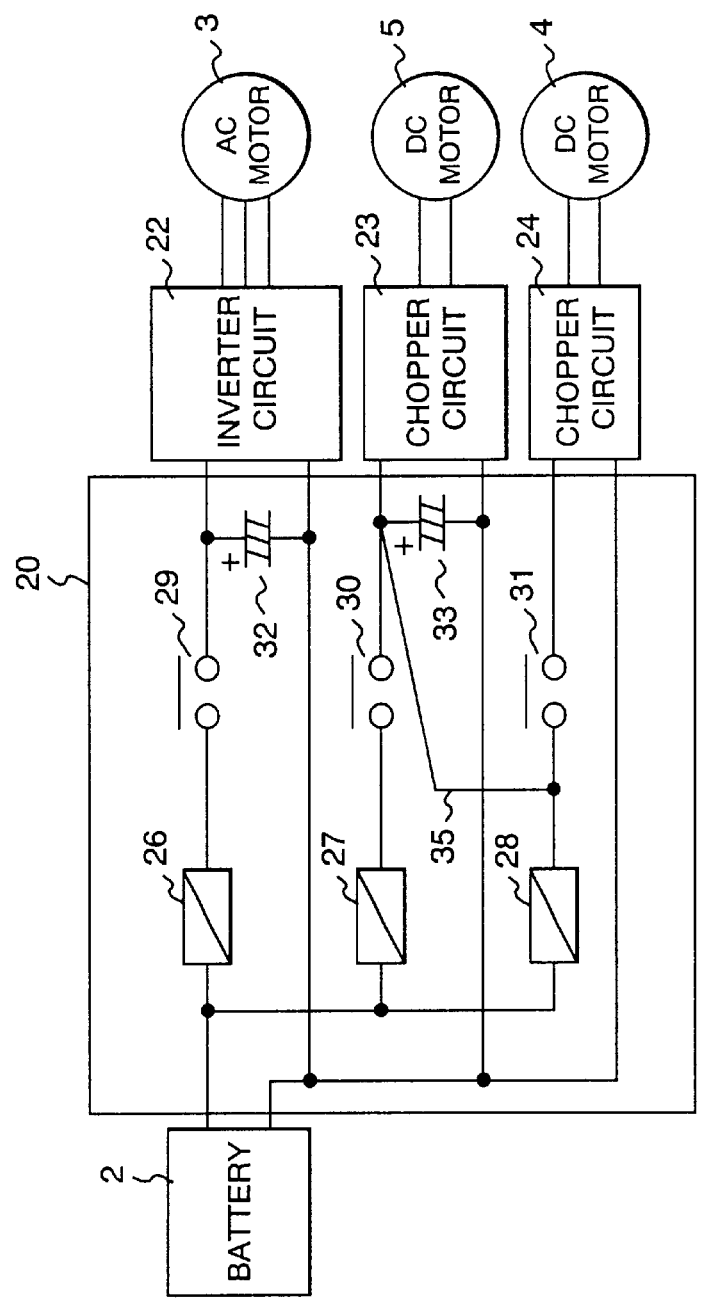
FIG. 7 is a block diagram showing a circuit configuration of a power distribution circuit of a control device for a forklift truck according to a fourth embodiment of the present invention.

A fourth embodiment of the present invention will be explained based on FIG. 7. FIG. 7. shows a circuit configuration of a power distribution circuit. Incidentally, other circuit configurations of a forklift truck and a control device are constructed in a manner similar to the previous embodiment. Only portions different from those of the power distribution circuit employed in the aforementioned embodiment will be explained below.

In the second and third embodiments, the positive electrode of the electrolytic capacitor 33 is connected to the chopper circuit 23 (24) side of the contactor 30 (31) on a wiring(this wiring is for connecting the positive electrode of the battery 2 and the positive electrode of the chopper circuit 23 (24) to avoid the blowing of the fuse 27 (28) or the stored charge due to the inrush current. However, while such a configuration needs to connect the extra electrolytic capacitors in consideration of the case where the contactor 30 (31) is made open, it is inadvisable to use such a configuration where the provision of space for connecting each electrolytic capacitor and an increase in cost with an increase in the number of electrolytic capacitors have been taken into consideration. Since the electrolytic capacitor 33 (34) is disconnected from the main circuit when the fuse 27 (28) melts down in such a configuration, the effect of the electrolytic capacitor is lost from the circuit.

The power distribution circuit 20 employed in the present embodiment has been configured in consideration of these problems. The positive electrode side of the electrolytic capacitor 33 is connected between the chopper circuit 23 side of the contactor 30 on a wiring this wiring is for connecting the positive electrode of the battery 2 and the positive electrode of the chopper circuit 23 and a wiring (this wiring is for connecting the negative electrode side of the battery 2 and the negative electrode of the chopper circuit 23, and furthermore the positive electrode is connected to the fuse 28 side of the contactor 31 on a wiring (this wiring is for connecting the positive electrode of the battery 2 and the positive electrode of the chopper circuit 24) by means of a connecting line 35. According to such a configuration, even when the fuse 27 melts down or the contactor 30 is made open, the whole electrostatic capacitance of the main circuit remains unchanged. Accordingly, the reliability of the power distribution circuit 20 can be enhanced without newly adding electrolytic capacitors. Incidentally, while a description has been made of the case in which the configuration of the present embodiment has been applied to the second embodiment herein, it can similarly be applied to the third embodiment.

(Fifth Embodiment)

Figure 8:
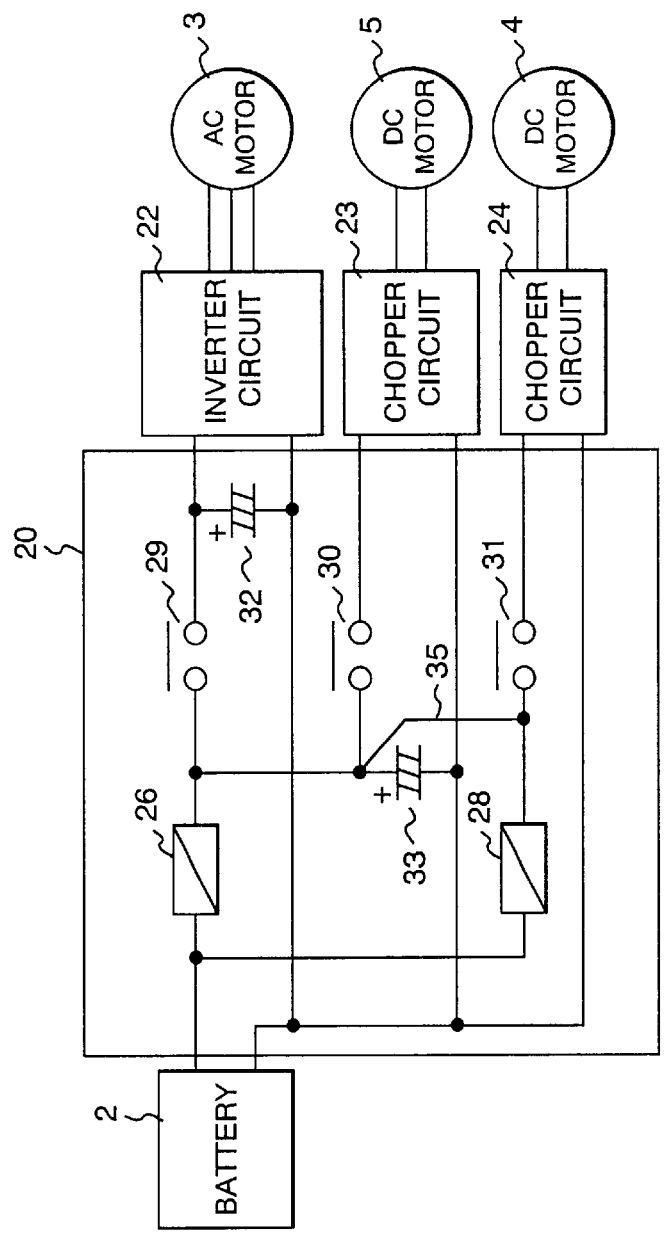
FIG. 8 is a block diagram showing a circuit configuration of a power distribution circuit of a control device for a forklift truck according to a fifth embodiment of the present invention.

A fifth embodiment of the present invention will be explained based on FIG. 8. FIG. 8 shows a circuit configuration of a power distribution circuit. Incidentally, other circuit configurations of a forklift truck and a control device are constructed in a manner similar to the previous embodiment. Only portions different from those of the power distribution circuit employed in the aforementioned embodiment will be explained below.

In the power distribution circuit 20 employed in the present embodiment, the positive electrode of a chopper circuit 23 is connected to the positive electrode of a battery 2 through a contactor 30 and a fuse 26 provided on the positive electrode sides of an inverter circuit 22. The positive electrode of an electrolytic capacitor 33 is connected between the fuse 26 and the contactor 30. Further, the positive electrode of the electrolytic capacitor 33 is connected via a connecting line 35 to the fuse 25 side of a contactor 31 on a wiring (this wiring is for connecting the positive electrode of the battery 2 and the positive electrode of a chopper circuit 24). According to such a configuration, the number of fuses can be reduced. Even when the fuse 26 is blown, the electrolytic capacitor 33 is assuredly connected in parallel with the chopper circuit 23. Accordingly, it is possible to achieve a further reduction in cost and improve the reliability of the power distribution circuit 20.

(Sixth Embodiment)

Figure 9:
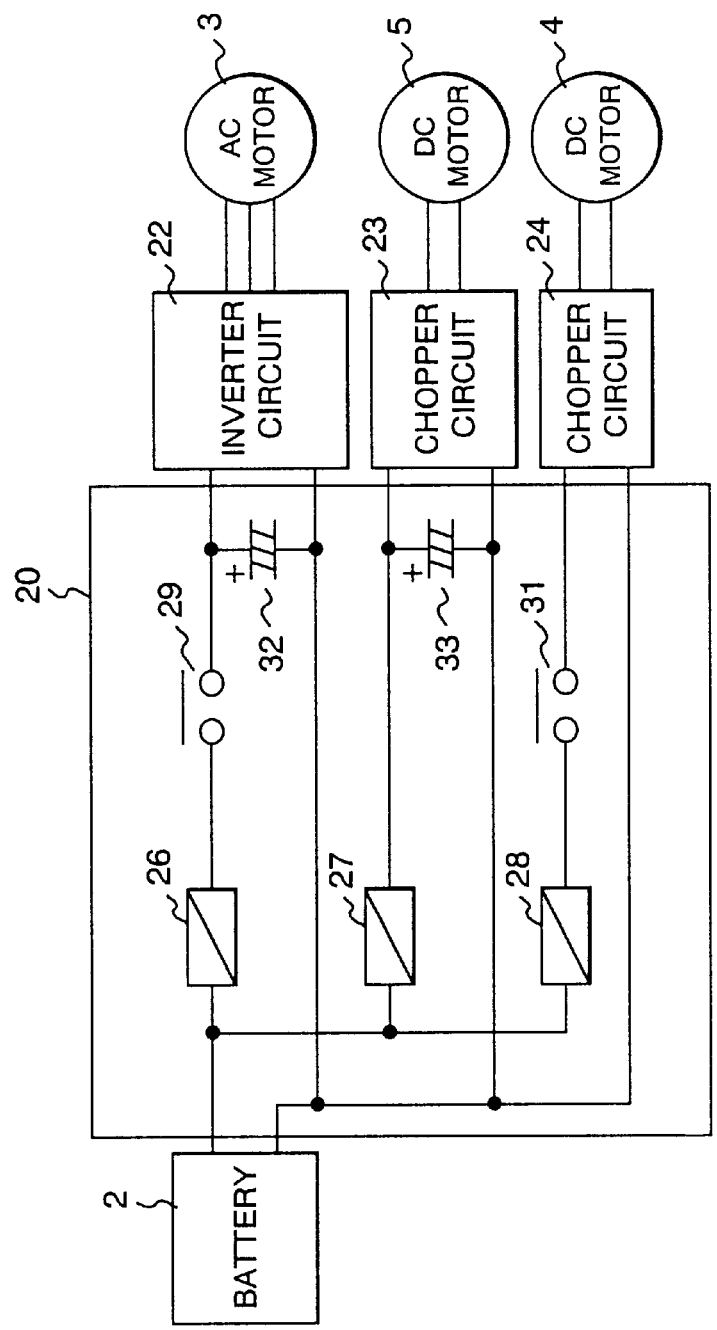
FIG. 9 is a block diagram showing a circuit configuration of a power distribution circuit of a control device for a forklift truck according to a sixth embodiment of the present invention.

A sixth embodiment of the present invention will be explained based on FIG. 9. FIG. 9 shows a circuit configuration of a power distribution circuit. Incidentally, other circuit configurations of a forklift truck and a control device are constructed in a manner similar to the previous embodiment. Only portions different from those of the power distribution circuit employed in the aforementioned embodiment will be explained below.

The power distribution circuit 20 employed in the present embodiment has omitted a contactor provided on a wiring for connecting the positive electrode of a battery 2 and the positive electrode of a chopper circuit 23. Since it is necessary to promptly and reliably cut off the supply of power from the battery 2 to an inverter circuit 22 and a chopper circuit 24 when a malfunction occurs therein, the inverter circuit 22 and the chopper circuit 24 requires contactors. However, even if a malfunction occurs in the chopper circuit 23, it does not lead to one fatal to a vehicle itself. Hence the chopper circuit 23 does not necessarily require the provision of a contactor. Therefore, the present embodiment has omitted the contactor provided on the wiring for connecting the positive electrode side of the battery 2 and the positive electrode side of the chopper circuit 23. According to such a configuration, it is possible to provide a further reduction in cost and achieve an effect similar to that obtained in the aforementioned embodiment.

(Seventh Embodiment)

Figure 10:
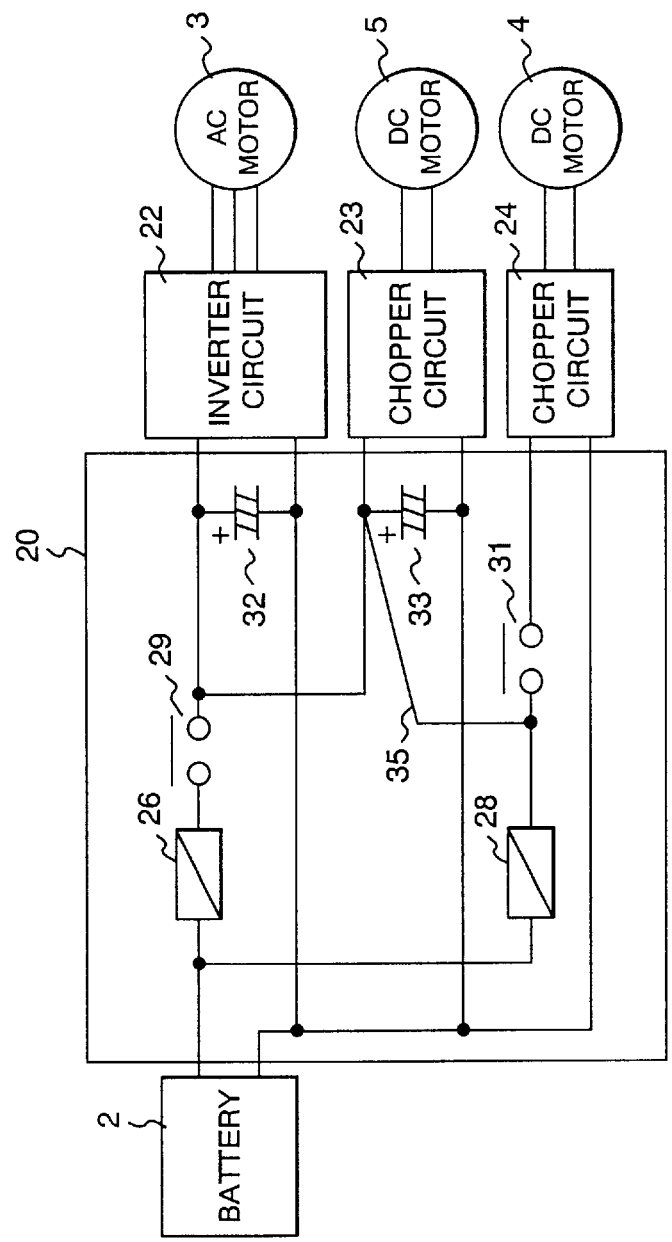
FIG. 10 is a block diagram showing a circuit configuration of a power distribution circuit of a control device for a forklift truck according to a seventh embodiment of the present invention.

A seventh embodiment of the present invention will be explained based on FIG. 10. FIG. 10 shows a circuit configuration of a power distribution circuit. Incidentally, other circuit configurations of a forklift truck and a control device are constructed in a manner similar to the previous embodiment. Only portions different from those of the power distribution circuit employed in the aforementioned embodiment will be explained below.

In the power distribution circuit 20 employed in the present embodiment, the positive electrode of a chopper circuit 23 is connected to the positive electrode of a battery 2 through a contactor 29 and a fuse 26 provided on the positive electrode side of an inverter circuit 22. The positive electrode of an electrolytic capacitor 33 is connected between the contactor 29 and the positive electrode side of the chopper circuit 23. Furthermore, the positive electrode of the electrolytic capacitor 33 is connected via a connecting line 35 to the fuse 28 side of a contactor 31 on a wiring (this wiring is for connecting the positive electrode of the battery 2 and the positive electrode of a chopper circuit 24). According to such a configuration, the numbers of fuses and contactors can be reduced. Even when the fuse 26 is blown or the contactor 29 is made open, the electrolytic capacitor 33 is assuredly connected in parallel with the chopper circuit 23. Accordingly, it is possible to achieve a further reduction in cost and improve the reliability of the power distribution circuit 20.

Incidentally, while the present embodiment has described the case in which the fuse and contactor on the chopper circuit 23 side are omitted, the fuse and contactor on the inverter circuit side may be omitted. Even when the configuration of the present embodiment is applied to one wherein the electrolytic capacitor is connected in parallel with the chopper circuit 24, a similar effect can be achieved.

(Eighth Embodiment)

Figure 11:
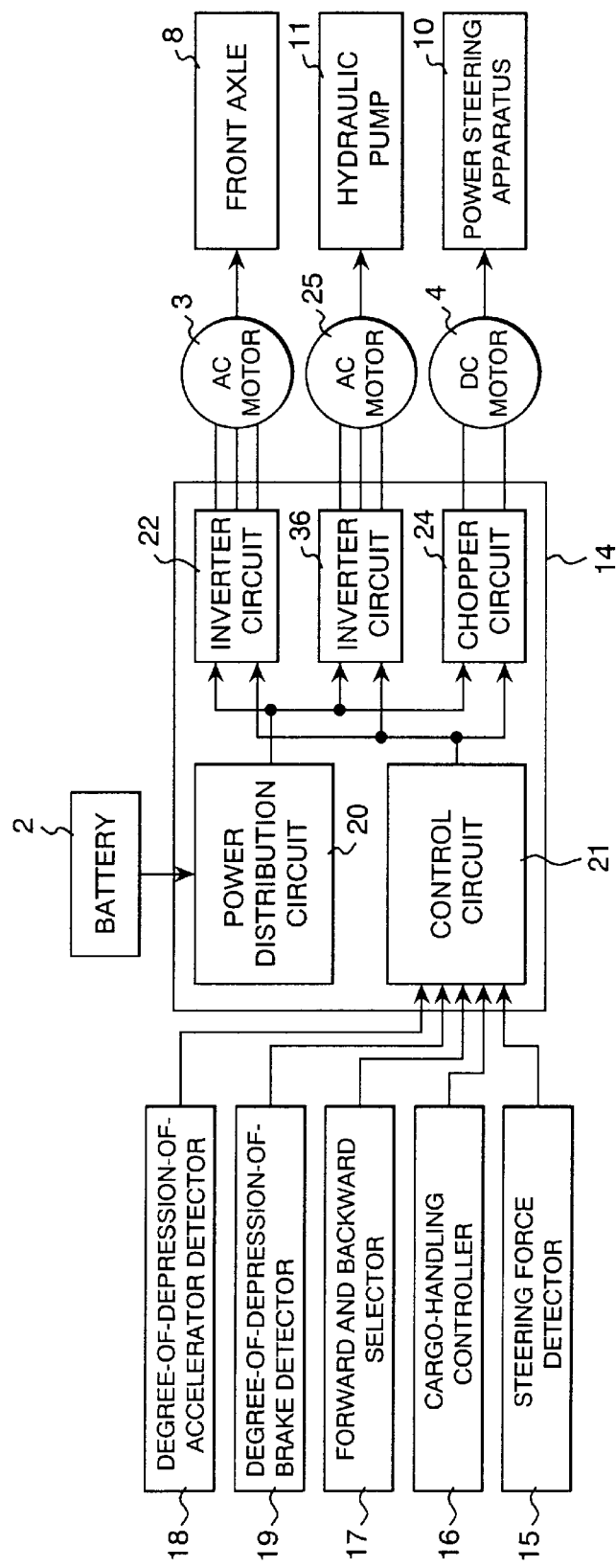
FIG. 11 is a block diagram showing a circuit configuration of a control device for a forklift truck according to an eighth embodiment of the present invention.

An eighth embodiment of the present invention will be described based on FIG. 11. FIG. 11 shows a circuit configuration of a control device. The present embodiment shows a case in which an AC motor is used as a motor 25 for driving a forklift device. Therefore, the control device 14 is provided with an inverter circuit 36, which is provided in association with the motor 25 and comprises at least one switching device, and which converts DC power supplied from a battery 2 to predetermined three-phase AC power, based on a cargo-handling control signal outputted from a control circuit 21 and supplies it to the motor 25. Even in the case of the embodiment. Having such a circuit configuration, the circuit configurations of the first through seventh embodiments can be applied to a power distribution circuit 20. Namely, the circuit configurations of the first through seventh embodiments can be applied even if the motor for driving the driving wheels, the steering auxiliary motor and the motor for driving the forklift device take either DC or AC.

According to the present invention, which provides very usable and economical electric vehicle for a user, since the vehicle provides a good tactile feeling to a driver, a drive system of an auxiliary steering device and a forklift device can be simplified in structure and reduced in cost.

According to the present invention as well, a plurality of power converting circuits can respectively be operated independent of one another. Further, even if any of the plurality of power converting circuits malfunctions, the remaining power converting circuits can be operated properly without being affected by such a power converting circuit. It is therefore possible to provide a control device high in reliability, which is suitable for use in an electric vehicle.

What is claimed is:

1. An electric vehicle comprising:
    a vehicle body;
    a plurality of pairs of wheels rotatably attached to the vehicle body;
    a power supply mounted to the vehicle body;
    a forklift device attached to the vehicle body and configured so that a fork thereof is movable in upward and downward directions;
    a first motor for driving at least one of said pairs of wheels;
    a second motor for assisting the steering of the wheel;
    a third motor for driving the forklift device; and
    a control device having a plurality of power converting circuits for respectively converting power supplied from the power supply and supplying the converted power to the first through third motors,
    wherein the plurality of power converting circuits are connected in parallel with the power supply, and capacitive elements are connected in parallel with at least two of the plurality of power converting circuits.

2. A control device suitable for an electric vehicle, comprising:
    a plurality of power converting circuits for respectively converting power supplied from a power supply and supplying the converted power to a motor for driving wheels, an auxiliary motor providing power to steer wheels, and a motor for driving a forklift device,
    wherein the plurality of power converting circuits are connected in parallel with the power supply, and capacitive elements are connected in parallel with at least two of the plurality of power converting circuits.

3. The control device according to claim 2, wherein a positive electrode of one of said one capacitive elements is connected to a side of an associated power converting circuit having an opening/closing means provided on the positive electrode side of the power converting circuit, and the positive electrode of said another capacitive element is connected to the power supply side having an opening/closing means provided on the positive electrode side of another of the power converting circuits.

4. The control device according to claim 2, wherein a positive electrode of said one capacitive element is connected to the positive electrode side of an associated power converting circuit and a positive electrode side of another power converting circuit.

5. The control device according to claim 2, wherein a positive electrode of one of said capacitive elements is connected to a side of an associated power converting circuit having an opening/closing means provided on the positive electrode side of the power converting circuit, and a positive electrode side of another capacitive element is connected to the power supply side having the opening/closing means provided on the positive electrode side of the associated power converting circuit and the positive electrode side of another power converting circuit.

6. The control device according to claim 2, wherein one of the power converting circuit, connected in parallel to one of said capacitive elements, has a positive electrode connected to the positive electrode side of another power converting circuit to which another one of said capacitive elements is parallel-connected, and a connected position one of the of the power converting circuits is at a side of said another converting circuit having a current cutting off means which is provided on a positive electrode side of an associated converting circuit, and the positive electrode side of said one capacitive element is connected to the positive electrode side of an associated power converting circuit and a positive electrode side of said another power converting circuit.

7. The control device according to claim 2, wherein one of the power converting circuits to which one of said capacitive elements is parallel-connected, has the positive electrode connected to the positive electrode side of another power converting circuit to which another one of said capacitive elements is parallel-connected, and a connected position of the one of the power converting circuits is at a side of said another power converting circuit having an opening/closing means provided on a positive electrode side of an associated power converting circuit, and the positive electrode side of said one capacitive element is connected to the positive electrode side of said one of the power converting circuits and the positive electrode side of said another power converting circuit.

* * * * *